(12) United States Patent
Yang et al.

(10) Patent No.: US 9,838,984 B2
(45) Date of Patent: Dec. 5, 2017

(54) POWER CONTROL METHOD AND SYSTEM FOR WIRELESS NETWORKS

(71) Applicant: INTEL IP CORPORATION, Santa Clara, CA (US)

(72) Inventors: Rongzhen Yang, Shanghai (CN); Hujun Yin, Saratoga, CA (US); Qinghua Li, San Ramon, CA (US); Huaning Niu, Milpitas, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/026,188

(22) PCT Filed: Dec. 23, 2013

(86) PCT No.: PCT/US2013/077523
§ 371 (c)(1),
(2) Date: Mar. 30, 2016

(87) PCT Pub. No.: WO2015/069306
PCT Pub. Date: May 14, 2015

(65) Prior Publication Data
US 2016/0219531 A1    Jul. 28, 2016

Related U.S. Application Data

(60) Provisional application No. 61/901,547, filed on Nov. 8, 2013.

(51) Int. Cl.
*H04B 7/00* (2006.01)
*H04W 52/36* (2009.01)
(Continued)

(52) U.S. Cl.
CPC ......... *H04W 52/367* (2013.01); *H04W 16/10* (2013.01); *H04W 52/262* (2013.01)

(58) Field of Classification Search
None
See application file for complete search history.

(56) References Cited

U.S. PATENT DOCUMENTS 7,991,423 B2 * 8/2011 Olson ................. H04L 63/0492
455/41.2
8,194,583 B2   6/2012 Zhu et al.
(Continued)

OTHER PUBLICATIONS

Ifeagwu, E., et al. ,"Evaluation of Spectral Efficiency, System Capacity and Interference Effects on CDMA Communication System", Jun. 2012, "(IJACSA) International Journal of Advanced Computer Science and Applications", vol. 3, No. 6, pp. 20-25.
(Continued)

*Primary Examiner* — Lana N Le

(57) ABSTRACT

Examples are disclosed for a system to improve wireless spectral efficiency, including a processor, memory coupled to the processor, a radio coupled to the processor, one or more antennas coupled to the radio, wireless logic to be executed on the processor component to process reception of a high-power request for open sharing (ROS) signal by a master wireless receiver from a master wireless transmitter and to process transmission of a high-power confirmation of open sharing (COS) signal to the master wireless transmitter, the high-power COS signal comprising an indication of a desired reduction of transmission power level from high power by the master wireless transmitter, and a timer initiated by the high-power COS signal, the timer to indicate a period of time when the master wireless transmitter and master wireless receiver are enabled for low-power communication.

25 Claims, 8 Drawing Sheets

(51) Int. Cl.
*H04W 52/26* (2009.01)
*H04W 16/10* (2009.01)

(56) References Cited

U.S. PATENT DOCUMENTS

| | | | | |
|---|---|---|---|---|
| 2001/0046875 | A1* | 11/2001 | Davies | H04L 1/1835 455/507 |
| 2002/0028675 | A1* | 3/2002 | Schmutz | H04B 7/2606 455/424 |
| 2005/0096074 | A1* | 5/2005 | Nanda | H04B 1/7183 455/522 |
| 2006/0199602 | A1* | 9/2006 | Zinn | H04W 52/48 455/522 |
| 2010/0216504 | A1* | 8/2010 | Olson | H04L 63/0492 455/522 |
| 2012/0038467 | A1* | 2/2012 | Sutardja | H05B 37/0254 340/12.33 |
| 2013/0242854 | A1 | 9/2013 | Cai et al. | |
| 2013/0243011 | A1* | 9/2013 | Ungerboeck | H04L 41/08 370/464 |
| 2015/0341869 | A1* | 11/2015 | Sen | H04W 52/34 455/522 |
| 2016/0192428 | A1* | 6/2016 | Friedman | H04W 76/023 455/41.2 |

OTHER PUBLICATIONS

Ekpenyong, M., et al., "Improving Spectral Efficiency of Spread Spectrum Systems Under Peak Load Network Conditions", Oct. 23-29, 2011, "ICSNC 2011: the Sixth International Conference on Systems and Networks Communications", Sant Joan Despi, Spain, pp. 1-8.

Pan, L., et al., "Power Controlled Network Protocols for Multi-Rate Ad Hoc Networks", Apr. 2009, "IEEE Transactions on Wireless Communications", vol. 8, No. 4, pp. 2142-2149.

International Search Report issued Aug. 7, 2014 in International Patent Application No. PCT/US2013/077523.

* cited by examiner

100

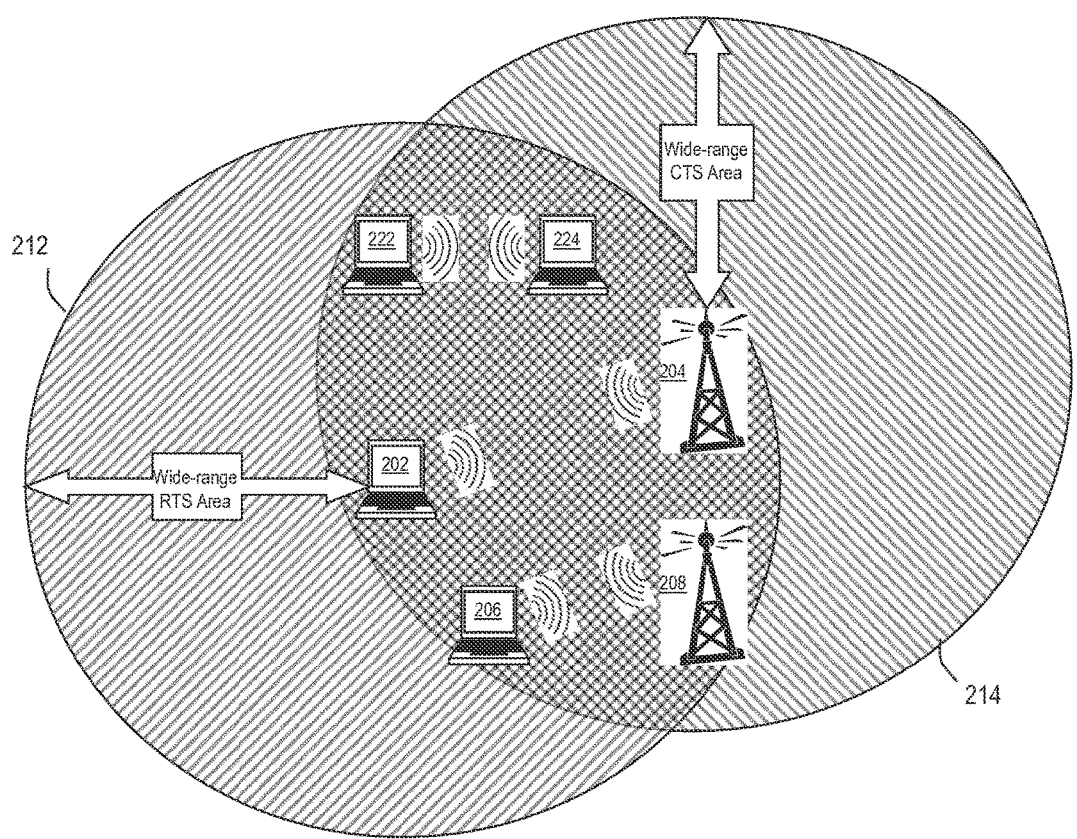

POWER CONTROL METHOD AND SYSTEM FOR WIRELESS NETWORKS

CROSS-REFERENCE TO RELATED APPLICATIONS

This application claims the benefit of U.S. Provisional Patent Application Ser. No. 61/901,547, filed on Nov. 8, 2013, the entire content of which is hereby incorporated by reference in its entirety.

TECHNICAL FIELD

Examples described herein are generally related to high-capacity wireless networking via power control.

BACKGROUND

The indoor radio environment is often dominated by computing devices having wireless capabilities that communicatively couple to other such devices having wireless capabilities and/or to an access point of a wireless local area network ("WLAN") using wireless technologies such as the Institute of Electrical and Electronic Engineers (IEEE) 802.11™ WLAN family of specifications (e.g., sometimes referred to as "Wi-Fi®"). Also, wireless technologies designed to operate in a 60 GHz communication band, such as IEEE 802.11ad (e.g., sometimes referred to as "WiGig®") may allow wireless capable devices to replace wired interconnects with high speed and relatively short range wireless interconnects via a process typically referred to as wireless docking. The high speed and relatively short range wireless interconnects using wireless technologies such as WiGig may allow wireless devices to wirelessly dock with devices having one or more input/output devices such as a display, a keyboard, a network interface card, a mouse or a storage device. In some examples, once wirelessly docked, the wireless device may utilize the one or more input/output devices in a same manner as when connected to a wired or physical docking station.

In various embodiments, it may be advantageous to enhance the efficiency and performance of wireless local area network (WLAN) deployments, for instance in situations that include dense network environments with large numbers of access points and stations. A WLAN employing such enhancements may be known as a high efficiency WLAN (HEW). In such situations, a transmitter that transmits at an excessively high power level may interfere with unintended receivers that are farther away than the intended receiver. Dense network environments may benefit from transmission power control for improved spectral reuse and concomitant capacity improvements.

Therefore, a need exists to provide improved spectral reuse and concomitant capacity improvements.

BRIEF DESCRIPTION OF THE DRAWINGS

FIG. 2 illustrates an example of wireless communications.

DETAILED DESCRIPTION

Figure 1:
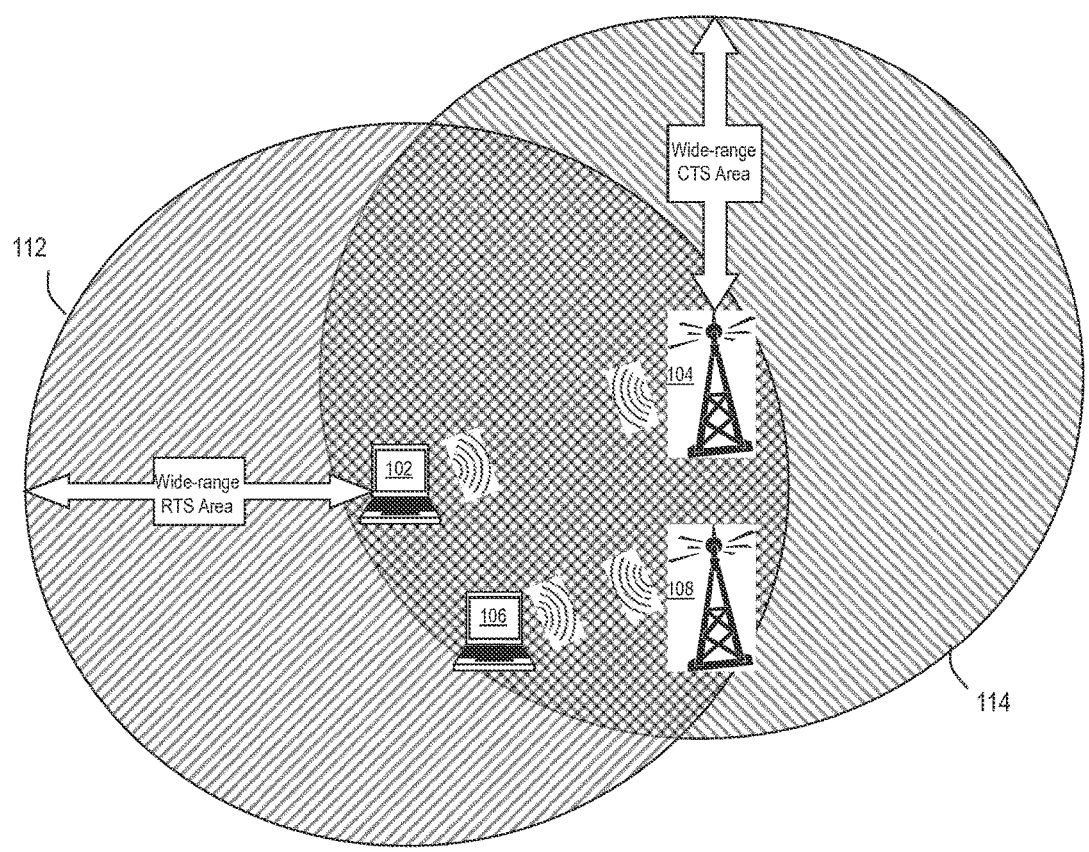
FIG. 1 illustrates an example of wireless communications.

Request to Send (RTS) and Clear to Send (CTS) are components of a mechanism used by the IEEE 802.11 wireless networking protocol to reduce frame collisions introduced by the hidden node problem. A node wishing to send data initiates the process by sending an RTS frame. The destination node replies with a CTS. Any other node receiving the RTS or CTS frame should refrain from sending data for a predetermined time, thus solving the hidden node problem. The amount of time the node should wait before trying to get access to the medium is indicated in both the RTS and the CTS frame. The RTS frame contains the amount of time that the other nodes should wait. The wait time is often called the back-off time. The duration field within the RTS frame indicates the amount of time in microseconds needed to transmit data or management+CTS+ACK+SIFS interval. The CTS frame includes a duration field with the amount of time in microseconds, obtained by the previous RTS minus time need to transmit CTS and its short interframe space (SIFS) interval. When combined with an ACK, any wireless node overhearing the exchange of RTS/CTS will cease to transmit during this period.

Examples are generally directed to improvements for wireless and/or mobile devices to improve overall capacity in an area that is densely populated with wireless communication devices. The wireless technologies are associated with Wi-Fi or WiGig. These wireless technologies may include establishing and/or maintaining wireless communication links through various frequency bands to include Wi-Fi and/or WiGig frequency bands, e.g., 2.4, 5 or 60 GHz. These wireless technologies may also include wireless technologies suitable for use with mobile devices or user equipment (UE) capable of coupling to other devices via a WLAN or via a peer-to-peer (P2P) wireless connection. For example, mobile devices and the other device may be configured to operate in compliance with various standards promulgated by the Institute of Electrical and Electronic Engineers (IEEE). These standards may include Ethernet wireless standards (including progenies and variants) associated with the IEEE Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11 Standard").

In some examples various IEEE standards associated with the IEEE 802.11 Standard such as IEEE 802.11a/b/g/n, IEEE 802.11ac or IEEE 802.11ad may be utilized by mobile devices or other devices to establish or maintain WLAN and/or P2P communication links and/or establish wireless communications with each other (e.g., wireless accessing). These other devices may have one or more input/output devices to possibly be used by mobile devices upon wirelessly access. The other devices may include wireless access capabilities and may include, but are not limited to, a docking device, a smart phone, a smart television, smart audio speakers, a notebook computer, a tablet computer, a netbook computer, other small computing devices (e.g., Ultrabook™ device—Ultrabook is a trademark of Intel Corporation in the U.S. and/or other countries), desktop computer, a workstation computer, a server, a handheld gaming device, a gaming console, a handheld media player or a media player console. The one or more input/output devices may either be integrated with the other devices or may be coupled via one or more wired and/or wireless connections.

FIG. 1 illustrates a configuration 100 useful for distributed transmission power control in accordance with an embodiment of the present disclosure. Configuration 100 includes a Wi-Fi enabled mobile device 102 and a base station 104 configured to communicate with mobile device 102. Base station 104 may be further communicatively coupled to other mobile devices 102 or to a wide area network such as the Internet (not illustrated in FIG. 1). Mobile device 102 and base station 104 together form a master pair that acquires a Wi-Fi channel and can share the Wi-Fi channel with other devices. Coverage area 112 indicates the limit of the wide-range RTS area captured by mobile device 102, and coverage area 114 indicates the limit of the wide-range CTS area captured by base station 104.

Configuration 100 further includes a Wi-Fi enabled mobile device 106 and a base station 108, which together form a slave pair that has at least one member within the combined coverage areas 112, 114 controlled by the master pair 102, 104.

Figure 5:
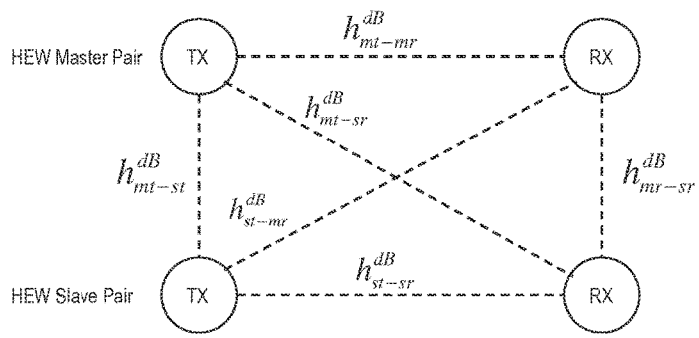
FIG. 5 illustrates an example of interference.

The master pair broadcasts requirements such as transmission power limits for channel sharing. Slave pairs that want to share the channel with the master pair receive the broadcasts and check the requirements within the broadcasts. The requirements are described below in further details in connection with FIG. 5 and Equations (1)-(8). If the slave pairs can meet the requirements set by the master pair, then the slave pairs are allowed to access the channel.

Configuration 100 may support multiple schemes as set or determined by the master pair. For example, one scheme supported by configuration 100 is for the master pair 102, 104 to limit interference from other sources within coverage areas 112, 114 to be at or below a predetermined threshold.

FIG. 2 illustrates a configuration 200 useful for distributed transmission power control in accordance with an embodiment of the present disclosure. Configuration 200 includes a Wi-Fi enabled mobile device 202 and a base station 204, which together form a master pair that acquires a Wi-Fi channel and can share the Wi-Fi channel with other devices. Coverage area 212 indicates the limit of the wide-range RTS area captured by mobile device 202, and coverage area 214 indicates the limit of the wide-range CTS area captured by base station 204.

Configuration 200 further includes a Wi-Fi enabled mobile device 206 and a base station 208, which together form a first slave pair that exists within the coverage areas 212, 214 controlled by the master pair 202, 204. In comparison to configuration 100, configuration 200 further includes a Wi-Fi enabled mobile device 222 and a Wi-Fi enabled mobile device 224, which together form a second slave pair that exists within the coverage areas 212, 214 controlled by the master pair 202, 204. The second slave pair 222, 224 represents additional capacity that is available due to the embodiments described herein.

Configuration 200 is able to support a distributed transmission power control (TPC) scheme. For example, the master pair 202, 204 may reserve a channel by exchanging full-power RTS/CTS messages. The reserved coverage provides protection within the coverage areas 212, 214 for the master and slave communication links.

The broadcasted power control requirements and/or rules enable low-power, short-range transmissions for slave pairs within coverage areas 212, 214. Each slave pair within the coverage areas 212, 214 wishing to communicate will use a low-power RTS/CTS message exchange to reserve the channel for its short-range communications. The power is sufficiently low such that the interference to other slave pairs is not significant.

Consequently, the spatial reuse of the network increases. Namely, the HEW pairs (e.g., master pairs and multiple slave pairs) may simultaneously utilize the same time-frequency resource with a corresponding huge spectrum efficiency improvement in high-density deployment.

Figure 3A:
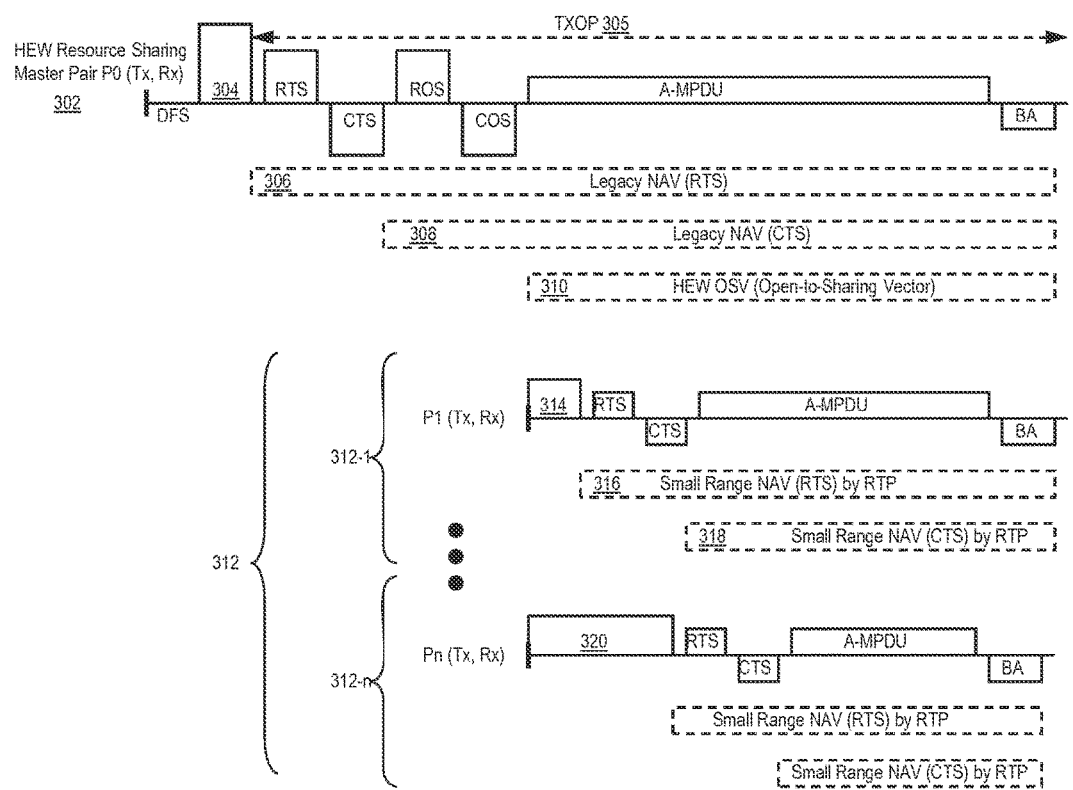
FIGS. 3A-3C illustrate examples of processes.

FIG. 3A illustrates a scenario 300 using a RTS/CTS mechanism that is useful for distributed transmission power control in accordance with an embodiment of the present disclosure. Scenario 300 includes timeline 302, which illustrates a message exchange by a HEW resource sharing master pair, the master pair including a first terminal and a second terminal. Messages illustrated above and adjacent to timeline 302 represent messages sent by the first terminal and received by the second terminal. Messages illustrated below and adjacent to timeline 302 represent messages sent by the second terminal and received by the first terminal. Messages are separated in time by a short inter-frame space (SIFS), which is a brief time required by a terminal to sense an end of a frame and to start transmitting. SIFS are not labeled in FIG. 3A for sake of clarity. Except for blocks 304, 314 and 320, which denote contention periods, the relative height that each message extends above or below from timeline 302 qualitatively corresponds to a signal strength of the corresponding transmission. Heights are not depicted to scale.

Scenario 300 further includes a set 312 of a plurality of timelines 312-1 . . . 312-n illustrating a message exchange by a HEW resource sharing slave pairs. For co-existence, both the master pair (e.g., master pair 202, 204) and the slave pairs use the RTS/CTS mechanism so that the master pair can reserve the channel from the legacy devices and the slave pairs can share the channel without collisions.

Embodiments in accordance with the present disclosure include a Request for Open Sharing (ROS) and a Confirmation of Open Sharing (COS), which are new Media Access Control (MAC) messages for broadcasting the necessary information of resource sharing and distributed TPC. Usage of ROS and COS will be illustrated with respect to FIGS. 3A-3C.

The ROS and COS messages act to reserve, for use by low power slave pairs, the transmit opportunities (TXOP) within reception range of the ROS and COS messages. TXOP is known as a time-space resource in the wireless channel. Each slave pair within such range will send its RTS/CTS messages with reduced power so that the master pair is not affected. The RTS/CTS may be further optimized for HEW, such as by usage of higher modulation schemes with attendant less signal overhead due to shorter distance, although legacy RTS/CTS may also be used.

Each slave pair corresponding to timelines 312-1 . . . 312-n should not transmit within a shared transmission opportunity (TXOP) slot if the channel is already reserved by a legacy device other than the master pair or by another slave pair.

The slave pairs will not send full-power RTS/CTS packets, which would otherwise affect nearby legacy devices, e.g., by causing the legacy devices to refrain from transmitting during a contention period. Omitting the full-power RTS/CTS reduces overhead at a cost of reliability of slave pair communication. Namely, channel reservation for all low-power pairs within coverage areas 212, 214, which prevents legacy interferences, is done only by the master pair 202, 204. Because of the short range of the low-power slave pairs, the protection provided by the master pair 202, 204 is usually adequate. However, slave pair corresponding to timelines 312-1 . . . 312-n may nevertheless perform RTS/CTS packets at a reduced power level.

Referring again to FIG. 3A, timeline 302 includes a contention period 304 during which the master pair 202, 204 make sure there are no other master pairs or legacy devices within coverage areas 212, 214 that want to communicate at that time. At the conclusion of contention period 304, the transmission opportunity (TXOP) 305 begins. TXOP 305 includes an RTS/CTS message exchange, followed by an ROS/COS message exchange. ROS/COS are new messages that are described below in greater detail. Thereafter follows an aggregation of MAC protocol data units (A-MPDU), and followed by a block acknowledgement (BA).

At the conclusion of contention period 304 begins a period of time denoted as Legacy NAV (RTS) 306. NAV is known as a network allocation vector. At the conclusion of the CTS message begins a period of time denoted as Legacy NAV (CTS) 308. The periods of time Legacy NAV (RTS) 306 and Legacy NAV (CTS) 308 are computed and tracked by each terminal that has received the respective RTS or CTS message, e.g., by way of a countdown timer in each respective terminals, which indicates how far into the future the medium has been reserved by the RTS/CTS exchanges.

At the start of the A-MPDU message through the end of the BA message is a period of time 310 denoted as HEW Open-to-Sharing Vector (OSV), during which the master pair may communicate in a low-power mode. During HEW OSV period 310, low-power slave pairs P1(Tx, Rx) . . . Pn(Tx, Rx) may also begin communicating. The period of time HEW OSV 310 is computed and tracked by each terminal that has received the ROS and/or COS messages, e.g., by way of a countdown timer in each respective terminals, which indicates how far into the future the medium is available for low-power usage. HEW OSV is described below in further detail in accordance with an embodiment of the present disclosure.

During OSV period 310, the plurality of timelines 312-1 . . . 312-n is active to handle low-power slave communications. For example, timeline 312-1 for slave pair 1 (P1) begins with a contention period, e.g., contention period 314. During contention period 314, the slave pair (P1) waits for the low-power channel to be available. At the conclusion of contention period 314, the low-power pair P1 exchange RTS/CTS messages, and then the low-power transmitter sends its own A-MPDU message, followed by a BA from the message receiver. A small range NAV (RTS) 316 period of time begins after contention period 314. A small range NAV (CTS) 318 period of time begins after the CTS message.

Timelines for other low-power pairs (e.g., Pn) proceed substantially the same as for timeline 312-1, except that the contention period (e.g., contention period 320) may be different to make sure that there is no contention with other low-power pairs within range of Pn.

Figure 3B:
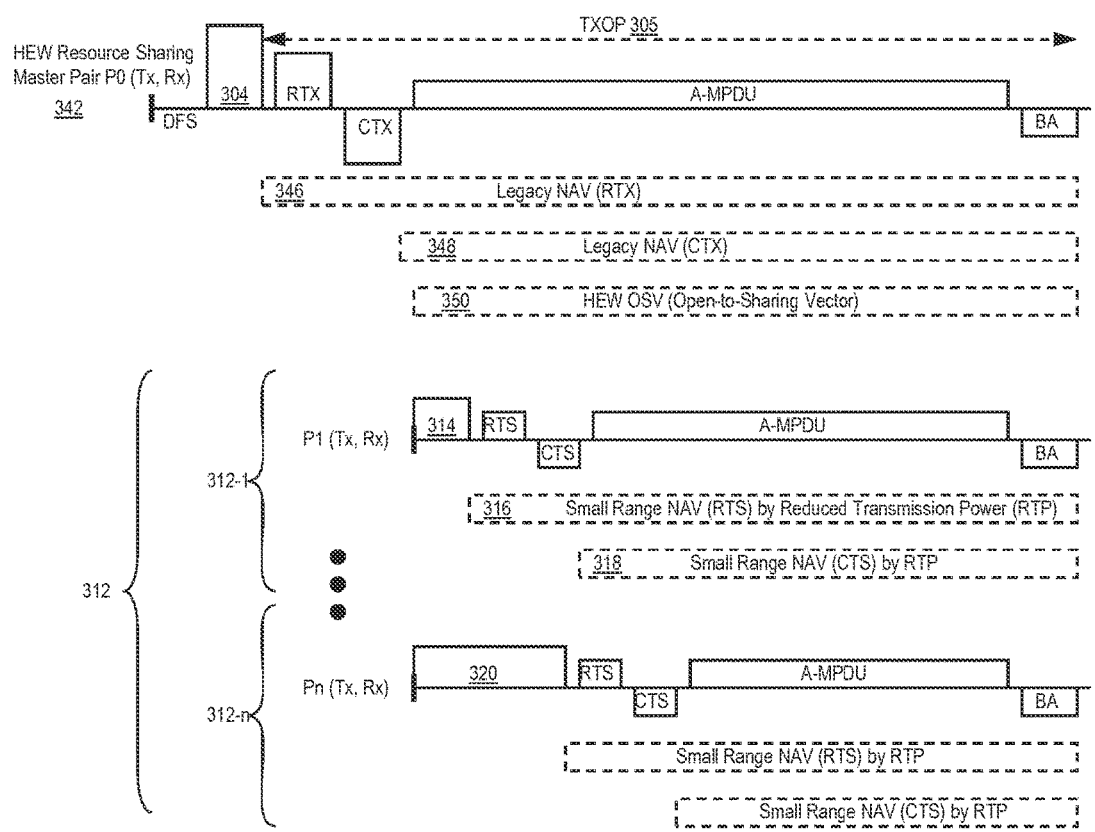

FIG. 3B illustrates a scenario 340 using modified mechanism that is useful for distributed transmission power control in accordance with an embodiment of the present disclosure. Scenario 340 is similar to scenario 300, except with respect to timeline 342. Timeline 342 includes a request-to-transmit (RTX) and clear-to-transmit (CTX) message pair between a master pair P0(Tx, Rx), which combine and replace the same information as the RTS/CTS and ROS/COS message pairs of timeline 302 in scenario 300. At the conclusion of the RTX/CTX message pair, the A-MPDU message may begin.

At the conclusion of contention period 304 begins a period of time denoted as Legacy NAV (RTX) 346. At the conclusion of the CTX message begins a period of time denoted as Legacy NAV (CTX) 348. The periods of time Legacy NAV (RTX) 346 and Legacy NAV (CTX) 348 are computed and tracked by each terminal that has received the respective RTX or CTX message, e.g., by way of a countdown timer in each respective terminals, which indicates how far into the future the medium has been reserved by the RTX/CTX exchanges.

At the start of the A-MPDU message through the end of the BA message is a period of time 350 denoted as HEW OSV, during which the master pair may communicate in a low-power mode. During HEW OSV period 350, low-power slave pairs P1(Tx, Rx) . . . Pn(Tx, Rx) may also begin communicating. The period of time HEW OSV 350 is computed and tracked by each terminal that has received the RTX and/or CTX messages, e.g., by way of a countdown timer in each respective terminals, which indicates how far into the future the medium is available for low-power usage. Other detail of scenario 340 is substantially the same as scenario 300.

Figure 3C:
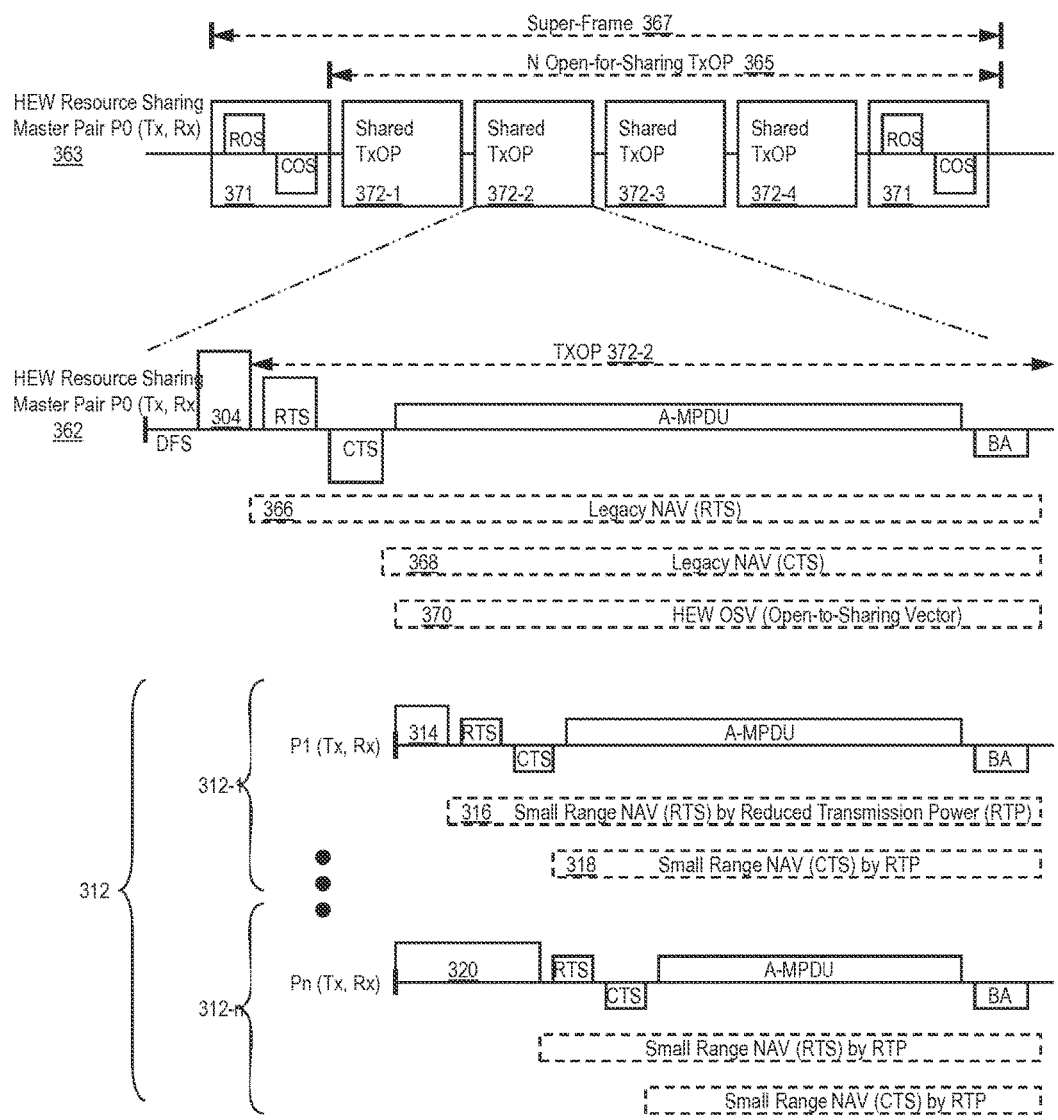

FIG. 3C illustrates a scenario 360 using another modified mechanism that is useful for distributed transmission power control in accordance with an embodiment of the present disclosure. Scenario 360 is similar to scenario 300 and scenario 340, except with respect to timeline 363. Timeline 363 illustrates a super-frame 367, which uses less overhead data transfer than timeline 342 or timeline 302. Super-frame 367 includes one ROS/COS message exchange 371, and a period of time 365 marked as N Open-for-Sharing TxOP, which in turn includes a plurality of shared TxOP 372-1 . . . 372-n, with 2≤n≤N, N a positive integer, and may be referred to collectively as shared TxOP 372. An individual but unspecified TxOP may be referred to as shared TxOP 372-n. As illustrated in FIG. 3C, N=4.

Timing within each of shared TxOP 372-n may be substantially identical. Timing within shared TxOP 372-2 is illustrated in greater detail as a representative example. Timing within shared TxOP 372-2 includes timeline 362. Timeline 362 includes contention period 304, a full-power RTS/CTS message pair, an A-MPDU message interval and a BA message, which have been individually described above in reference to timelines 302 and/or 342.

Shared TxOP 372-2 further includes a legacy NAV (RTS) period 366 that commences after contention period 304, and a legacy NAV (CTS) period 368 that commences after the CTS message. The periods of time Legacy NAV (RTS) 366 and Legacy NAV (CTS) 368 are computed and tracked by each terminal that has received the respective RTS or CTS message, e.g., by way of a countdown timer in each respective terminals, which indicates how far into the future the medium has been reserved by the RTS/CTS exchanges.

At the start of the A-MPDU message through the end of the BA message is a period of time 370 denoted as HEW OSV period 370, during which the master pair may communicate in a low-power mode. During HEW OSV period 370, low-power slave pairs P1(Tx, Rx) . . . Pn(Tx, Rx) may also begin communicating. The period of time HEW OSV 370 is computed and tracked by each terminal that has received the ROS and/or COS messages, e.g., by way of a countdown timer in each respective terminals, which indicates how far into the future the medium is available for low-power usage.

The remainder of the timing of shared TxOP 372-2 includes a plurality 312 of transmitter/receiver slave pairs, which is substantially identical to the corresponding portion of FIG. 3A-3B.

In accordance with an embodiment of the present disclosure, the COS message includes information that is used to implement transmission power control. The information includes a TPC Backoff Level ($R_{backoff}^{dB}$), which is an indication of a desired reduction of transmission power level, by a communication partner, from a full transmission power level. TPC Backoff Level may be sent by a receiver to a transmitter for recommending a transmission power. The transmitter may take this feedback into account for calculating an actual transmission power.

The COS message information may further include a reference modulation and coding scheme (MCS) level ($M_{reference}$), which is an indication of the MCS level used for calculating TPC backoff value. A receiver may send the reference MCS level information to a transmitter. The receiver suggests an MCS associated with the TPC backoff level. In other words, the TPC backoff level is for the targeted reference MCS level.

$R_{backoff}^{dB}$ and $M_{reference}$ are used to provide feedback from the receiver to the transmitter for power control and link rate adaptation. The transmitter may decide the actual power and MCS according to the feedback and other factors.

In accordance with an embodiment of the present disclosure, the ROS message includes information that is used to implement transmission power control. The information in the ROS message includes the Current Full Transmission Power Level ($P_{Full}^{dBm}$) which is used as reference value to estimate the path loss. This parameter specifies the transmission power level of the packet carrying the parameter so that each receiver can estimate the path loss using the parameter and the received signal strength.

The ROS message may further include an Interference Threshold of Admission ($T^{dBm}$), which is an allowed interference level seen by the devices of the master pair. $T^{dBm}$ informs nearby devices that the master pair can tolerate an interference level below $T^{dBm}$. If the master pair will use bi-directional traffic, then $T^{dBm}$ may apply to both nodes of the master pair. If the master pair will use only one-way traffic, then $T^{dBm}$ may apply only to the receiver of the master pair. $T^{dBm}$ sets an upper limit of the transmission power of nearby slave device.

Figure 4:
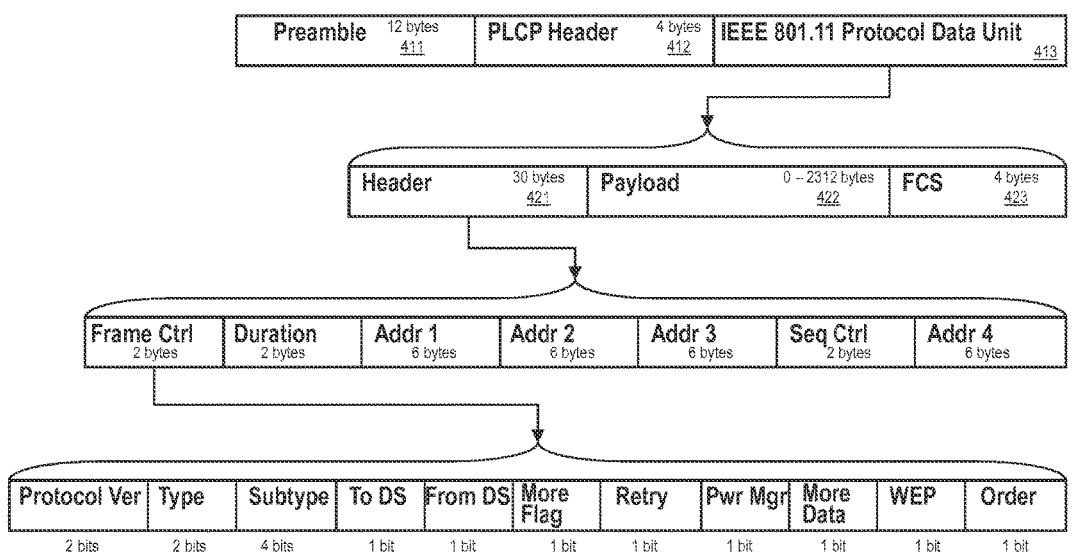
FIG. 4 is a diagram of an IEEE 802.11 header as known in the art.

Transmission of the new messages described herein, e.g., ROS/COS, and the period of time denoted as HEW OSV, may be accomplished by use of known wireless communication protocols such as Wi-Fi. Wi-Fi is a frame-based communication protocol. FIG. 4 illustrates an IEEE 802.11 frame format 400 as known in the art. A transmitted signal conforming to frame format 400 may be referred to as a packet. Frame format 400 may be divided into a twelve-byte preamble field 411, a four-byte physical layer convergence procedure ("PLCP") header field 412, and a variable-length protocol data unit ("PDU") field 413. PDU field 413 may be further subdivided into a thirty-byte header field 421, a variable-length payload field 422, and a four-byte frame check sequence ("FCS") field 423. Payload field 422 may vary in length between zero and 2,312 bytes. Therefore, the minimum length for frame format 400 is fifty bytes when the payload field 422 is of zero length. Payload field 422 may be used to transport the new messages such as ROS/COS.

After potential slave pairs receive the ROS/COS messages, the potential slave pairs evaluate the admission rules for the purpose of checking the admission of resource sharing. Evaluation by the slave pairs is described below and in FIG. 5, assuming bi-directional traffic for the master pair.

A process for evaluating emission rules includes calculating maximum transmission powers of the transmitter and receiver of the slave pair, respectively. The maximum power is limited by the interference threshold set by the two master pair devices, in accordance with Equations (1) and (2).

$$P_{st}^{dBm} = \min(T_{mt}^{dBm} + h_{mt\text{-}st}^{dBm}, T_{mr}^{dBm} + T_{mr\text{-}st}^{dBm}) \quad (1)$$

$$P_{sr}^{dBm} = \min(T_{mt}^{dBm} + h_{mt\text{-}sr}^{dBm}, T_{mr}^{dBm} + T_{mr\text{-}sr}^{dBm}) \quad (2)$$

In Equation (1), $P_{st}^{dBm}$ is the maximum transmission power of slave transmitter in dB scale, $T_{mt}^{dBm}$ is the tolerable interference threshold of the transmitter of the master pair in dB scale, $h_{mt\text{-}st}^{dBm}$ is the path loss between master transmitter and slave transmitter, and $h_{mr\text{-}st}^{dBm}$ is the path loss between master receiver and slave transmitter.

In Equation (2), $P_{sr}^{dBm}$ is the maximum tolerable power at the slave receiver in dB scale, $h_{mt\text{-}sr}^{dBm}$ is the path loss between master transmitter and slave receiver, and $h_{mr\text{-}sr}^{dBm}$ is the path loss between master receiver and slave receiver.

Next, the process for evaluating emission rules includes estimating the signal to interference noise ratio (estimated SINR, or eSINR) in order to check the link efficiency, in accordance with Equations (3) and (4).

$$eSINR_{st}^{dB} = P_{sr}^{dBm} - h_{st\text{-}sr}^{dBm} - I_{st}^{dBm} \quad (3)$$

$$eSINR_{sr}^{dB} = P_{st}^{dBm} - h_{st\text{-}sr}^{dBm} - I_{sr}^{dBm} \quad (4)$$

In Equation (3), $I_{st}^{dBm}$ is the power level of non-slave interference plus noise at the slave transmitter, in a dB scale. In Equation (4), $I_{sr}^{dBm}$ is the power level of non-slave interference plus noise at the slave receiver, in a dB scale.

If the estimated SINR meets the pre-defined rate threshold for the link, then the potential slave pair will try to reuse the time and/or frequency resource by a reduced power.

For the master pair, the parameters $R_{backoff}^{dB}$ and $T^{dBm}$ are used in evaluating a signal to interference noise ratio in accordance with Equations (5) and (6) below.

$$SINR_{mr,deg\_radiation}^{dB} = 10\log 10\left(\frac{N * T_{mr}^{Linear} + I_{mr}^{Linear}}{I_{mr}^{Linear}}\right) \quad (5)$$

$$SINR_{mt,deg\_radiation}^{dB} = 10\log 10\left(\frac{N * T_{mt}^{Linear} + I_{mt}^{Linear}}{I_{mt}^{Linear}}\right) \quad (6)$$

$$SINR_{mr,rts}^{dB} - R_{mt,backoff}^{dB} - SINR_{mr,deg\_radiation}^{dB} \geq SINR_{mr,target}^{dB} \quad (7)$$

$$SINR_{mt,cts}^{dB} - R_{mr,backoff}^{dB} - SINR_{mt,deg\_radiation}^{dB} \geq SINR_{mt,target}^{dB} \quad (8)$$

In Equations (5)-(8), $SINR_{mt,target}^{dB}$ and $SINR_{mr,target}^{dB}$ are the target SINR values at the master transmitter and receiver, respectively. N is the estimated number of slave pairs. $I_{mr}^{Linear}$ and $I_{mt}^{Linear}$ are the power levels of non-slave interference plus noise at master receiver and transmitter in linear scale, respectively. $SINR_{mr,degradation}^{dB}$ is the performance degradation allowed in the master pair.

The master pair decides to share a transmission resource (e.g., TXOP, time or frequency slot, etc.) according to following conditions:

First, in a low density environment, the power control and spatial reuse do not bring a significant gain since not enough slave pairs join the shared channel. Therefore, the master pair initially may detect the density of transmitters and receivers. Collision rate of CSMA/CS may be used as a good indicator for density detection.

Second, since the interference from the slave pairs reduce the quality of the master's channel, the master pair needs to have a channel quality above a predetermined threshold, such that the interference can be tolerated. The evaluated channel gain, SINR, and power backoff values can be good indicators for the master pair to evaluate the channel quality.

Embodiments in accordance with the present disclosure make use of new control variables and mechanisms. When conventional one-way traffic is assumed, some embodiments may reduce complexity and maximize backward compatibility by making the following simplifications:

First, the master pair may use conventional RTS/CTS to acquire a channel or TXOP.

Second, the master pair may share the acquired channel or TXOP with slave pairs by sending an announcement packet, e.g., the COS packet. The announcement packet may be sent by the transmitter of the master pair to the slave pairs. The announcement packet may further include an indication of the reduction of power level of subsequent data packets with respect to the power level of the announcement packet, or the power level of the current regulation region. The regulation region refers to geographical area (e.g., usually a country) covered by a regulatory regime on radio transmissions (e.g., Federal Communication Commission (FCC) regulations in the United States). A tolerable interference level may be implicitly specified in a specification, or may explicitly specified by the announcement packet.

Third, within the shared TXOP, all of the slave pairs use the same power level and conventional CSMA to access the shared channel. The power level can be deduced from the announcement packet. For example, the power level may be the same as the master pair's data packet or a predetermined level below (in dBs) the master's power level. Using the CSMA, a slave device may hold its transmission if the transmission would cause an above-threshold interference to existing receive devices.

Embodiments in accordance with the present disclosure provide a distributed TPC process that may be used to improve the performance of WLAN communication systems. Embodiments provide an improved process for simultaneous transmission for spatial reuse and backward compatibility with legacy Wi-Fi devices.

Figure 6:
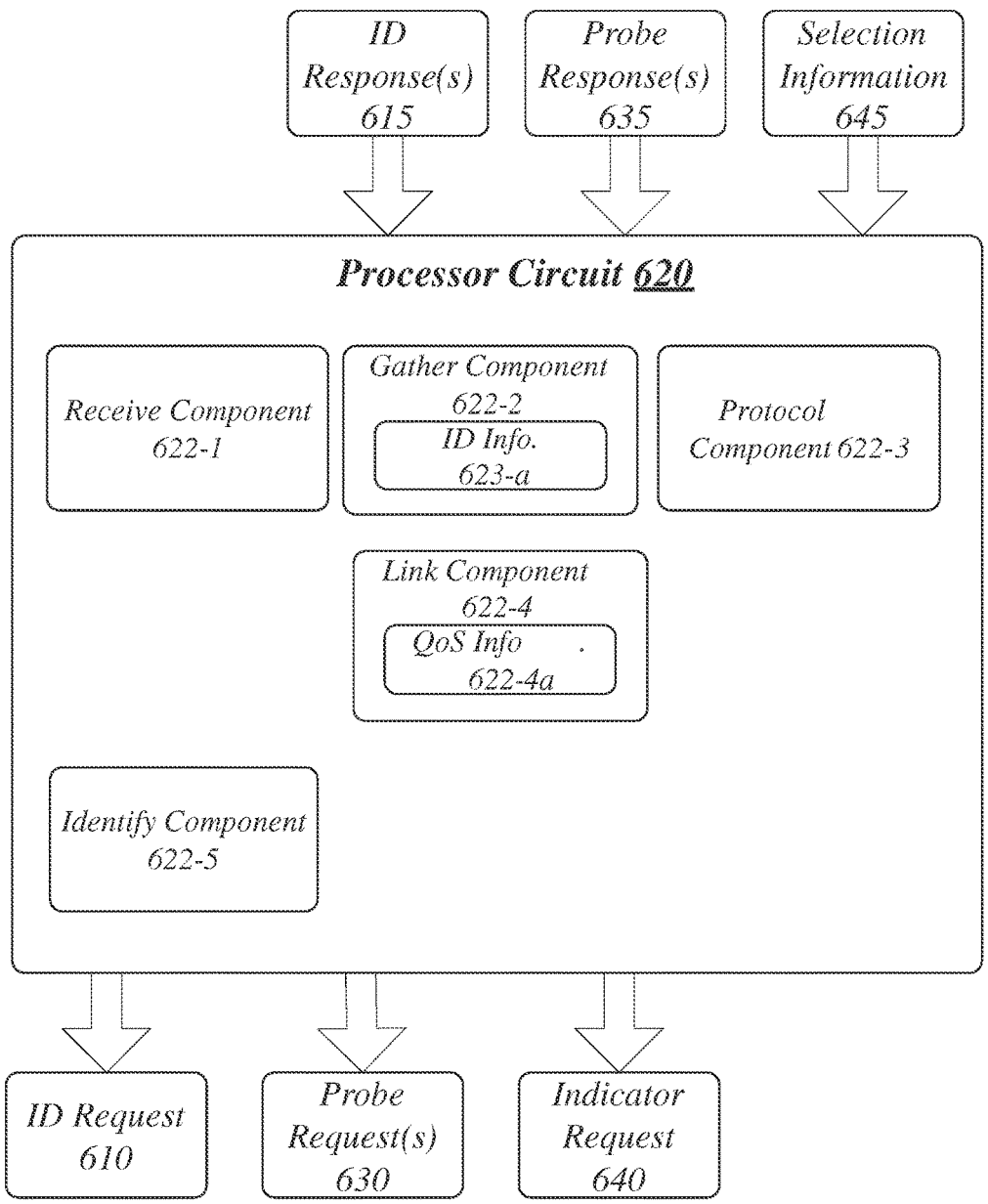
FIG. 6 illustrates an example of a block diagram for an apparatus.

FIG. 6 illustrates a block diagram for a first apparatus. As shown in FIG. 6, the first apparatus includes an apparatus 600. Although apparatus 600 shown in FIG. 6 has a limited number of elements in a certain topology or configuration, it may be appreciated that apparatus 600 may include more or less elements in alternate configurations as desired for a given implementation.

Apparatus 600 may be usable as Wi-Fi enabled mobile device 102, base station 104, slave Wi-Fi enabled mobile device 106 and/or base station 108 illustrated in FIG. 1.

The apparatus 600 may comprise a computer and/or firmware implemented apparatus 600 having a processor circuit 620 arranged to execute one or more components 622-a. It is worthy to note that "a" and "b" and "c" and similar designators as used herein are intended to be variables representing any positive integer. Thus, for example, if an implementation sets a value for a=5, then a complete set of components 622-a may include modules 622-1, 622-2, 622-3, 622-4 or 622-5. The embodiments are not limited in this context.

According to some examples, apparatus 600 may be part of a mobile device that may be capable of operating in compliance with one or more wireless technologies such as those described in or associated with the IEEE 802.11 standards. For example, the mobile device having apparatus 600 may be arranged or configured to wirelessly couple to a Wi-Fi access point or another Wi-Fi communication device.

In some examples, as shown in FIG. 6, apparatus 600 includes processor circuit 620. Processor circuit 620 may be generally arranged to execute one or more components 622-a. The processor circuit 620 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as processor circuit 620. According to some examples processor circuit 620 may also be an application specific integrated circuit (ASIC) and components 622-a may be implemented as hardware elements of the ASIC.

According to some examples, apparatus 600 may include a receive component 622-1. Receive component 622-1 may be executed by processor circuit 620 to receive Wi-Fi probe responses and/or other communication messages in accordance with embodiments of the present disclosure.

In some examples, apparatus 600 may also include a gather component 622-2. Gather component 622-2 may be executed by processor circuit 620 to gather identification information from one or more devices capable of wirelessly communicating with the mobile device. Gather component 622-2 may gather identification information included locations of Wi-Fi access points and/or other Wi-Fi devices and at least temporarily store the gathered identification information with ID information 623-a. According to some examples, gather component 622-2 may maintain ID information 623-a in a data structure such as a lookup table (LUT).

In some examples, apparatus 600 may also include a link component 622-4. Link component 622-4 may be executed by processor circuit 620 to determine link conditions (e.g., interference, collisions, etc.) between the mobile device and the one or more devices based on a technique utilizing the Wi-Fi frequency band. Information associated with operation of or measurements by link component 622-4 may be stored as QoS information 622-4a. According to some examples, distance information 622-4a may be maintained in a LUT or other type of data structure.

In some examples, apparatus 600 may also include a protocol component 622-3. Protocol component 622-3 may be executed by processor circuit 620 in order to communicate on a protocol level or layer with other devices. For example, protocol component 622-3 may interpret incoming messages, may gather and/or analyze data such as link conditions that may be needed to practice the embodiments, and may formulate outgoing messages in accordance with the protocols described herein.

According to some examples, apparatus 600 may also include an identify component 622-5. Identify component 622-5 may be executed by processor circuit 620 to identify the given device from among the one or more devices based on predetermined criteria.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
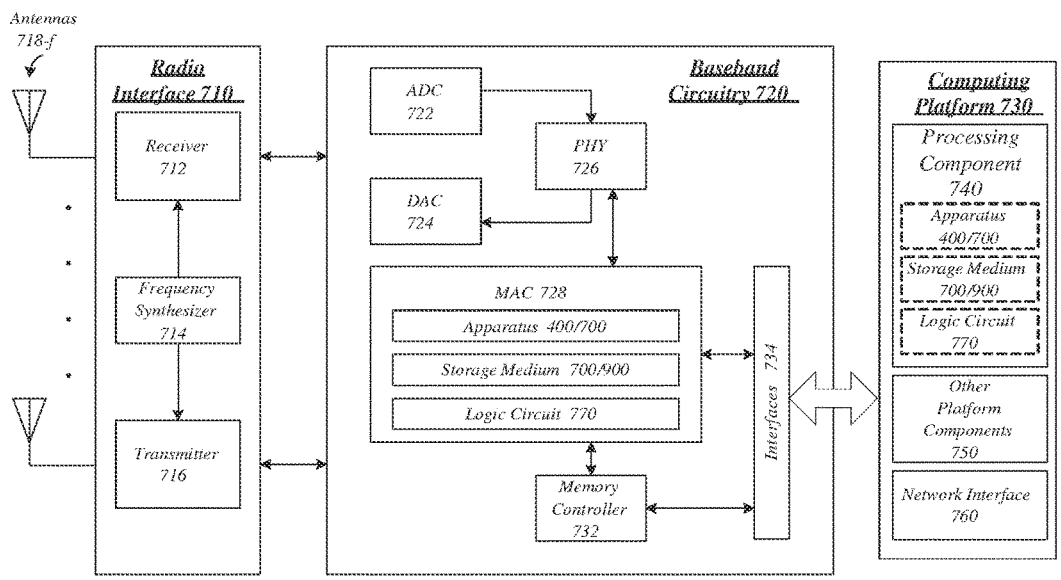
FIG. 7 illustrates an example of a device.

FIG. 7 illustrates an embodiment of a device 600. In some examples, device 700 may be configured or arranged for wireless communications in a wireless network. Device 700 may implement, for example, a Wi-Fi access point, a storage medium and/or a logic circuit 770. The logic circuit 770 may include physical circuits to perform operations described for other apparatus. As shown in FIG. 7, device 700 may include a radio interface 710, baseband circuitry 720, and computing platform 730, although examples are not limited to this configuration.

The device 700 may implement some or all of the structure and/or operations for apparatus, storage medium 700/900 and/or logic circuit 770 in a single computing entity, such as entirely within a single device. The embodiments are not limited in this context.

Radio interface 710 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 710 may include, for example, a receiver 712, a transmitter 716 and/or a frequency synthesizer 714. Radio interface 710 may include bias controls, a crystal oscillator and/or one or more antennas 718-$f$. In another embodiment, radio interface 710 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 720 may communicate with radio interface 710 to process receive and/or transmit signals and may include, for example, an analog-to-digital converter 722 for down converting received signals, a digital-to-analog converter 724 for up converting signals for transmission. Further, baseband circuitry 720 may include a baseband or physical layer (PHY) processing circuit 726 for PHY link layer processing of respective receive/transmit signals. Baseband circuitry 720 may include, for example, a processing circuit 728 for medium access control (MAC)/data link layer processing. Baseband circuitry 720 may include a memory controller 732 for communicating with MAC processing circuit 728 and/or a computing platform 730, for example, via one or more interfaces 734.

In some embodiments, PHY processing circuit 726 may include a frame construction and/or detection module, in combination with additional circuitry such as a buffer memory, to construct and/or deconstruct communication frames (e.g., containing subframes). Alternatively or in addition, MAC processing circuit 728 may share processing for certain of these functions or perform these processes independent of PHY processing circuit 726. In some embodiments, MAC and PHY processing may be integrated into a single circuit.

Computing platform 730 may provide computing functionality for device 700. As shown, computing platform 730 may include a processing component 740. In addition to, or alternatively of, baseband circuitry 720 of device 700 may execute processing operations or logic for other apparatus, a storage medium, and logic circuit 770 using the processing component 730. Processing component 740 (and/or PHY 726 and/or MAC 728) may comprise various hardware elements, software elements, or a combination of both. Examples of hardware elements may include devices, logic devices, components, processors, microprocessors, circuits, processor circuits (e.g., processor circuit 720), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 730 may further include other platform components 750. Other platform components 750 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 730 may further include a network interface 760. In some examples, network interface 760 may include logic and/or features to support network interfaces operated in compliance with one or more wireless broadband technologies such as those described in one or more standards associated with IEEE 802.11 such as IEEE 802.11ad.

Device 700 may be, for example, user equipment, a computer, a personal computer (PC), a desktop computer, a laptop computer, a notebook computer, a netbook computer, a tablet computer, other small computing devices, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 700 described herein, may be included or omitted in various embodiments of device 700, as suitably desired. In some embodiments, device 700 may be configured to be compatible with protocols and frequencies associated with IEEE 802.11 Standards for WLANs and/or for wireless docking, although the examples are not limited in this respect.

Embodiments of device 700 may be implemented using single input single output (SISO) antenna architectures. However, certain implementations may include multiple antennas (e.g., antennas 718-f) for transmission and/or reception using adaptive antenna techniques for beamforming or spatial division multiple access (SDMA) and/or using multiple input multiple output (MIMO) communication techniques.

The components and features of device 700 may be implemented using any combination of discrete circuitry, application specific integrated circuits (ASICs), logic gates and/or single chip architectures. Further, the features of device 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In some examples, an example system may include a processor component and memory coupled to the processor component. The system may also include a radio coupled to the processor component and one or more antennas coupled to the radio. The system may also include wireless logic to be executed on the processor component to process reception of a high-power request for open sharing (ROS) signal by a master wireless receiver from a master wireless transmitter and to process transmission of a high-power confirmation of open sharing (COS) signal to the master wireless transmitter, the high-power COS signal comprising an indication of a desired reduction of transmission power level from high power by the master wireless transmitter. The system may also include a timer initiated by the high-power COS signal, the timer to indicate a period of time when the master wireless transmitter and master wireless receiver are enabled for low-power communication.

According to some examples of the system, the master wireless receiver to transmit the high-power COS signal to a slave wireless transmitter and to a slave wireless receiver, the timer to indicate a period of time when the slave wireless transmitter and slave wireless receiver are enabled for low-power communication.

According to some examples of the system, the high-power COS signal comprises a reference modulation and coding scheme (MCS) level.

According to some examples of the system, the high-power ROS signal comprises a current full transmission power level of the master wireless transmitter.

According to some examples of the system, the high-power ROS signal comprises an allowed interference level that the master wireless receiver is able to tolerate.

According to some examples of the system, the high-power COS is used by a slave processor to calculate at least one of a maximum transmission power of the slave wireless transmitter and a maximum tolerable power at the slave wireless receiver.

According to some examples of the system, the slave processor is further to calculate a signal to interference noise ratio at the slave wireless receiver by use of the maximum transmission power of the slave wireless transmitter and a maximum tolerable power at the slave wireless receiver.

According to some examples of the system, the slave wireless transmitter and the slave wireless receiver operate by reusing a time and frequency resource at reduced power based upon the signal to interference noise ratio at the slave wireless receiver.

According to some examples of the system, the master wireless transmitter and master wireless receiver are enabled for low-power communication if a density of transmitters and receivers that can provide a sufficiently strong signal to the master wireless transmitter and master wireless receiver exceeds a predetermined threshold.

According to some examples of the system, the master wireless transmitter and master wireless receiver are enabled for low-power communication if a quality of low-power communication exceeds a predetermined threshold.

According to some examples of the system, the ROS signal is combined with a request to transmit (RTX) signal, and the COS signal is combined with a clear to send (CTS) signal.

According to some examples of the system, the ROS signal is transmitted less frequently than a request to transmit (RTX) signal, and the COS signal is transmitted less frequently than a clear to send (CTS) signal.

In some examples, an example apparatus may include a processor component and a wireless transceiver to receive a wireless signal from a computing device. The apparatus may also include wireless logic to be executed on the processor component to process reception of a high-power request for open sharing (ROS) signal by a master wireless receiver from a master wireless transmitter and to process transmission of a high-power confirmation of open sharing (COS) signal to the master wireless transmitter, the high-power COS signal comprising an indication of a desired reduction of transmission power level from high power by the master wireless transmitter. The apparatus may also include a timer initiated by the high-power COS signal, the timer to indicate a period of time when the master wireless transmitter and master wireless receiver are enabled for low-power communication.

According to some examples of the apparatus, the master wireless receiver to transmit the high-power COS signal to a slave wireless transmitter and to a slave wireless receiver, the timer to indicate a period of time when the slave wireless transmitter and slave wireless receiver are enabled for low-power communication.

According to some examples of the apparatus, the high-power COS signal comprises a reference modulation and coding scheme (MCS) level.

According to some examples of the apparatus, the high-power ROS signal comprises a current full transmission power level of the master wireless transmitter.

According to some examples of the apparatus, the high-power ROS signal comprises an allowed interference level that the master wireless receiver is able to tolerate.

According to some examples of the apparatus, the high-power COS used by a slave processor to calculate at least one of a maximum transmission power of the slave wireless transmitter and a maximum tolerable power at the slave wireless receiver.

According to some examples of the apparatus, the slave processor further to calculate a signal to interference noise ratio at the slave wireless receiver by use of the maximum transmission power of the slave wireless transmitter and a maximum tolerable power at the slave wireless receiver.

According to some examples of the apparatus, the slave wireless transmitter and the slave wireless receiver operate by reusing a time and frequency resource at reduced power based upon the signal to interference noise ratio at the slave wireless receiver.

According to some examples of the apparatus, the master wireless transmitter and master wireless receiver are enabled for low-power communication if a density of transmitters and receivers that can provide a sufficiently strong signal to the master wireless transmitter and master wireless receiver exceeds a predetermined threshold.

According to some examples of the apparatus, the master wireless transmitter and master wireless receiver are enabled for low-power communication if a quality of low-power communication exceeds a predetermined threshold.

According to some examples of the apparatus, the ROS signal combined with a request to transmit (RTX) signal, and the COS signal combined with a clear to send (CTS) signal.

According to some examples of the apparatus, the ROS signal transmitted less frequently than a request to transmit (RTX) signal, and the COS signal transmitted less frequently than a clear to send (CTS) signal.

In some examples, an example computer-readable storage medium comprises instructions that, when executed, cause a controller to process reception of a high-power request for open sharing (ROS) signal by a master wireless receiver from a master wireless transmitter, to process transmission of a high-power confirmation of open sharing (COS) signal to the master wireless transmitter, the high-power COS signal comprising an indication of a desired reduction of transmission power level from high power by the master wireless transmitter, and to maintain a timer initiated by the high-power COS signal, the timer to indicate a period of time when the master wireless transmitter and master wireless receiver are enabled for low-power communication.

According to some examples, the computer-readable storage medium further includes instructions that, when executed, cause a controller to process transmission of the high-power COS signal to a slave wireless transmitter and to a slave wireless receiver, the timer to indicate a period of time when the slave wireless transmitter and slave wireless receiver are enabled for low-power communication.

According to some examples of the computer-readable storage medium, the high-power COS signal comprising a reference modulation and coding scheme (MCS) level.

According to some examples of the computer-readable storage medium, the high-power ROS signal comprising a current full transmission power level of the master wireless transmitter.

According to some examples of the computer-readable storage medium, the high-power ROS signal comprising an allowed interference level that the master wireless receiver is able to tolerate.

According to some examples of the computer-readable storage medium, the high-power COS used by a slave processor to calculate at least one of a maximum transmission power of the slave wireless transmitter and a maximum tolerable power at the slave wireless receiver.

According to some examples of the computer-readable storage medium, the slave processor further to calculate a signal to interference noise ratio at the slave wireless receiver by use of the maximum transmission power of the slave wireless transmitter and a maximum tolerable power at the slave wireless receiver.

According to some examples of the computer-readable storage medium, the slave wireless transmitter and the slave wireless receiver to operate by reusing a time and frequency resource at reduced power based upon the signal to interference noise ratio at the slave wireless receiver.

According to some examples of the computer-readable storage medium, the master wireless transmitter and master wireless receiver are enabled for low-power communication if a density of transmitters and receivers that can provide a sufficiently strong signal to the master wireless transmitter and master wireless receiver exceeds a predetermined threshold.

According to some examples of the computer-readable storage medium, the master wireless transmitter and master wireless receiver are enabled for low-power communication if a quality of low-power communication exceeds a predetermined threshold.

According to some examples of the computer-readable storage medium, the ROS signal combined with a request to transmit (RTX) signal, and the COS signal combined with a clear to send (CTS) signal.

According to some examples of the computer-readable storage medium, the ROS signal transmitted less frequently than a request to transmit (RTX) signal, and the COS signal transmitted less frequently than a clear to send (CTS) signal.

In some examples, an example method may include receiving a high-power request for open sharing (ROS) signal by a master wireless receiver from a master wireless transmitter, transmitting a high-power confirmation of open sharing (COS) signal to the master wireless transmitter, the high-power COS signal comprising an indication of a desired reduction of transmission power level from high power by the master wireless transmitter, and timing by use of a timer derived from the high-power COS signal, the timer to indicate a period of time when the master wireless transmitter and master wireless receiver are enabled for low-power communication.

According to some examples of the method, further comprising transmitting the high-power COS signal to a slave wireless transmitter and to a slave wireless receiver, the timer to indicate a period of time when the slave wireless transmitter and slave wireless receiver are enabled for low-power communication.

According to some examples of the method, the high-power COS signal comprising a reference modulation and coding scheme (MCS) level.

According to some examples of the method, the high-power ROS signal comprising a current full transmission power level of the master wireless transmitter.

According to some examples of the method, the high-power ROS signal comprising an allowed interference level that the master wireless receiver is able to tolerate.

According to some examples of the method, the high-power COS used by a slave processor to calculate at least one of a maximum transmission power of the slave wireless transmitter and a maximum tolerable power at the slave wireless receiver.

According to some examples of the method, the slave processor further to calculate a signal to interference noise ratio at the slave wireless receiver by use of the maximum transmission power of the slave wireless transmitter and a maximum tolerable power at the slave wireless receiver.

According to some examples of the method, the slave wireless transmitter and the slave wireless receiver to operate by reusing a time and frequency resource at reduced power based upon the signal to interference noise ratio at the slave wireless receiver.

According to some examples of the method, the master wireless transmitter and master wireless receiver are enabled for low-power communication if a density of transmitters and receivers that can provide a sufficiently strong signal to the master wireless transmitter and master wireless receiver exceeds a predetermined threshold.

According to some examples of the method, the master wireless transmitter and master wireless receiver are enabled for low-power communication if a quality of low-power communication exceeds a predetermined threshold.

According to some examples of the method, the ROS signal combined with a request to transmit (RTX) signal, and the COS signal combined with a clear to send (CTS) signal.

According to some examples of the method, the ROS signal transmitted less frequently than a request to transmit (RTX) signal, and the COS signal transmitted less frequently than a clear to send (CTS) signal.

In some examples, an example apparatus may include means for receiving a high-power request for open sharing (ROS) signal by a master wireless receiver from a master wireless transmitter, means for transmitting a high-power confirmation of open sharing (COS) signal to the master wireless transmitter, the high-power COS signal comprising an indication of a desired reduction of transmission power level from high power by the master wireless transmitter, and means for timing by use of the high-power COS signal, the timer to indicate a period of time when the master wireless transmitter and master wireless receiver are enabled for low-power communication.

According to some examples, the apparatus further comprises means for transmitting the high-power COS signal to a slave wireless transmitter and to a slave wireless receiver, the timer to indicate a period of time when the slave wireless transmitter and slave wireless receiver are enabled for low-power communication.

According to some examples of the apparatus, the high-power COS signal comprising a reference modulation and coding scheme (MCS) level.

According to some examples of the apparatus, the high-power ROS signal comprising a current full transmission power level of the master wireless transmitter.

According to some examples of the apparatus, the high-power ROS signal comprising an allowed interference level that the master wireless receiver is able to tolerate.

According to some examples of the apparatus, the high-power COS is used by a slave processor to calculate at least one of a maximum transmission power of the slave wireless transmitter and a maximum tolerable power at the slave wireless receiver.

According to some examples of the apparatus, the slave processor further to calculate a signal to interference noise ratio at the slave wireless receiver by use of the maximum transmission power of the slave wireless transmitter and a maximum tolerable power at the slave wireless receiver.

According to some examples of the apparatus, the slave wireless transmitter and the slave wireless receiver to operate by reusing a time and frequency resource at reduced power based upon the signal to interference noise ratio at the slave wireless receiver.

According to some examples of the apparatus, the master wireless transmitter and master wireless receiver are enabled for low-power communication if a density of transmitters and receivers that can provide a sufficiently strong signal to the master wireless transmitter and master wireless receiver exceeds a predetermined threshold.

According to some examples of the apparatus, the master wireless transmitter and master wireless receiver are enabled for low-power communication if a quality of low-power communication exceeds a predetermined threshold.

According to some examples of the apparatus, the ROS signal combined with a request to transmit (RTX) signal, and the COS signal combined with a clear to send (CTS) signal.

According to some examples of the apparatus, ROS signal transmitted less frequently than a request to transmit (RTX) signal, and the COS signal transmitted less frequently than a clear to send (CTS) signal.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. An apparatus to improve wireless spectral efficiency, comprising:
   a processor component;
   a wireless transceiver to receive a wireless signal;
   wireless logic to be executed on the processor component
      to process reception of a higher-power request for open sharing (ROS) signal by a master wireless receiver from a master wireless transmitter and to process transmission of a higher-power confirmation of open sharing (COS) signal to the master wireless transmitter, the higher-power COS signal to comprise an indication of a reduction of transmission power level by the master wireless transmitter; and a timer initiated by the higher-power COS signal, the timer to indicate a period of time when the master wireless transmitter and master wireless receiver are enabled for lower-power communication.

2. The apparatus of claim 1, further comprising:
the master wireless receiver to transmit the higher-power COS signal to a slave wireless transmitter and to a slave wireless receiver, the timer to indicate a period of time when the slave wireless transmitter and slave wireless receiver are enabled for lower-power communication, the higher-power COS used by a slave processor to calculate at least one of a maximum transmission power of the slave wireless transmitter and a maximum tolerable power at the slave wireless receiver.

3. The apparatus of claim 2, the slave processor further to calculate a signal to interference noise ratio at the slave wireless receiver by use of the maximum transmission power of the slave wireless transmitter and a maximum tolerable power at the slave wireless receiver.

4. The apparatus of claim 3, the slave wireless transmitter and the slave wireless receiver to operate by reusing a time and frequency resource at reduced power based upon the signal to interference noise ratio at the slave wireless receiver.

5. The apparatus of claim 1, the higher-power COS signal to comprise a reference modulation and coding scheme (MCS) level.

6. The apparatus of claim 1, the higher-power ROS signal to comprise at least one of a current full transmission power level of the master wireless transmitter and an allowed interference level that the master wireless receiver is able to tolerate.

7. The apparatus of claim 1, the ROS signal combined with a request to transmit (RTX) signal, and the COS signal combined with a clear to send (CTS) signal.

8. The apparatus of claim 1, the ROS signal transmitted less frequently than a request to transmit (RTX) signal, and the COS signal transmitted less frequently than a clear to send (CTS) signal.

9. A system to improve wireless spectral efficiency, comprising:
a processor component;
memory coupled to the processor component;
a radio coupled to the processor component;
one or more antennas coupled to the radio;
wireless logic to be executed on the processor component to process reception of a higher-power request for open sharing (ROS) signal by a master wireless receiver from a master wireless transmitter and to process transmission of a higher-power confirmation of open sharing (COS) signal to the master wireless transmitter, the higher-power COS signal to comprise an indication of a reduction of transmission power level by the master wireless transmitter; and
a timer initiated by the higher-power COS signal, the timer to indicate a period of time when the master wireless transmitter and master wireless receiver are enabled for lower-power communication.

10. The system of claim 9, further comprising:
the master wireless receiver to transmit the higher-power COS signal to a slave wireless transmitter and to a slave wireless receiver, the timer to indicate a period of time when the slave wireless transmitter and slave wireless receiver are enabled for lower-power communication, the higher-power COS used by a slave processor to calculate at least one of a maximum transmission power of the slave wireless transmitter and a maximum tolerable power at the slave receiver,
the slave processor further to calculate a signal to interference noise ratio at the slave wireless receiver by use of the maximum transmission power of the slave wireless transmitter and a maximum tolerable power at the slave wireless receiver, and
the slave wireless transmitter and the slave wireless receiver to operate by reusing a time and frequency resource at reduced power based upon the signal to interference noise ratio at the slave wireless receiver.

11. The system of claim 9, the higher-power ROS signal to comprise at least one of a current full transmission power level of the master wireless transmitter and an allowed interference level that the master wireless receiver is able to tolerate.

12. The system of claim 9, the ROS signal combined with a request to transmit (RTX) signal, and the COS signal combined with a clear to send (CTS) signal.

13. The system of claim 9, the ROS signal transmitted less frequently than a request to transmit (RTX) signal, and the COS signal transmitted less frequently than a clear to send (CTS) signal.

14. At least one non-transitory computer-readable storage medium comprising instructions that, when executed, cause a controller to:
process reception of a higher-power request for open sharing (ROS) signal by a master wireless receiver from a master wireless transmitter;
process transmission of a higher-power confirmation of open sharing (COS) signal to the master wireless transmitter, the higher-power COS signal to comprise an indication of a reduction of transmission power level by the master wireless transmitter; and
maintain a timer initiated by the higher-power COS signal, the timer to indicate a period of time when the master wireless transmitter and master wireless receiver are enabled for lower-power communication.

15. The least one computer-readable storage medium of claim 14, further instructions that, when executed, cause a controller to:
process transmission of the higher-power COS signal to a slave wireless transmitter and to a slave wireless receiver, the timer to indicate a period of time when the slave wireless transmitter and slave wireless receiver are enabled for lower-power communication, the higher-power COS used by a slave processor to calculate at least one of a maximum transmission power of the slave wireless transmitter and a maximum tolerable power at the slave wireless receiver,
the slave processor further to calculate a signal to interference noise ratio at the slave wireless receiver by use of the maximum transmission power of the slave wireless transmitter and a maximum tolerable power at the slave wireless receiver, and
the slave wireless transmitter and the slave wireless receiver to operate by reusing a time and frequency resource at reduced power based upon the signal to interference noise ratio at the slave wireless receiver.

16. The least one computer-readable storage medium of claim 14, the ROS signal combined with a request to transmit (RTX) signal, and the COS signal combined with a clear to send (CTS) signal.

17. The least one computer-readable storage medium of claim 14, the ROS signal transmitted less frequently than a request to transmit (RTX) signal, and the COS signal transmitted less frequently than a clear to send (CTS) signal.

18. A method to improve wireless spectral efficiency, comprising:
receiving a higher-power request for open sharing (ROS) signal by a master wireless receiver from a master wireless transmitter;
transmitting a higher-power confirmation of open sharing (COS) signal to the master wireless transmitter, the higher-power COS signal to comprise an indication of a reduction of transmission power level by the master wireless transmitter; and
timing by use of a timer derived from the higher-power COS signal, the timer to indicate a period of time when the master wireless transmitter and master wireless receiver are enabled for lower-power communication.

19. The method of claim 18, further comprising:
transmitting the higher-power COS signal to a slave wireless transmitter and to a slave wireless receiver, the timer to indicate a period of time when the slave wireless transmitter and slave wireless receiver are enabled for lower-power communication, the higher-power COS used by a slave processor to calculate at least one of a maximum transmission power of the slave wireless transmitter and a maximum tolerable power at the slave wireless receiver,
the slave processor further to calculate a signal to interference noise ratio at the slave wireless receiver by use of the maximum transmission power of the slave wireless transmitter and a maximum tolerable power at the slave wireless receiver, and
the slave wireless transmitter and the slave wireless receiver to operate by reusing a time and frequency resource at reduced power based upon the signal to interference noise ratio at the slave wireless receiver.

20. The method of claim 18, the ROS signal combined with a request to transmit (RTX) signal, and the COS signal combined with a clear to send (CTS) signal.

21. The method of claim 18, the ROS signal transmitted less frequently than a request to transmit (RTX) signal, and the COS signal transmitted less frequently than a clear to send (CTS) signal.

22. An apparatus to improve wireless spectral efficiency, comprising:
means for receiving a higher-power request for open sharing (ROS) signal by a master wireless receiver from a master wireless transmitter;
means for transmitting a higher-power confirmation of open sharing (COS) signal to the master wireless transmitter, the higher-power COS signal to comprise an indication of a reduction of transmission power level by the master wireless transmitter; and
means for timing by use of the higher-power COS signal, the timer to indicate a period of time when the master wireless transmitter and master wireless receiver are enabled for lower-power communication.

23. The apparatus of claim 22, further comprising:
means for transmitting the higher-power COS signal to a slave wireless transmitter and to a slave wireless receiver, the timer to indicate a period of time when the slave wireless transmitter and slave wireless receiver are enabled for lower-power communication, the higher-power COS used by a slave processor to calculate at least one of a maximum transmission power of the slave wireless transmitter and a maximum tolerable power at the slave wireless receiver
the slave processor further to calculate a signal to interference noise ratio at the slave wireless receiver by use of the maximum transmission power of the slave wireless transmitter and a maximum tolerable power at the slave wireless receiver, and
the slave wireless transmitter and the slave wireless receiver to operate by reusing a time and frequency resource at reduced power based upon the signal to interference noise ratio at the slave wireless receiver.

24. The apparatus of claim 22, the ROS signal combined with a request to transmit (RTX) signal, and the COS signal combined with a clear to send (CTS) signal.

25. The apparatus of claim 22, the ROS signal transmitted less frequently than a request to transmit (RTX) signal, and the COS signal transmitted less frequently than a clear to send (CTS) signal.

* * * * *